May 6, 1930.  H. V. HAIGHT  1,757,082
PISTON ROD
Filed Feb. 17, 1927
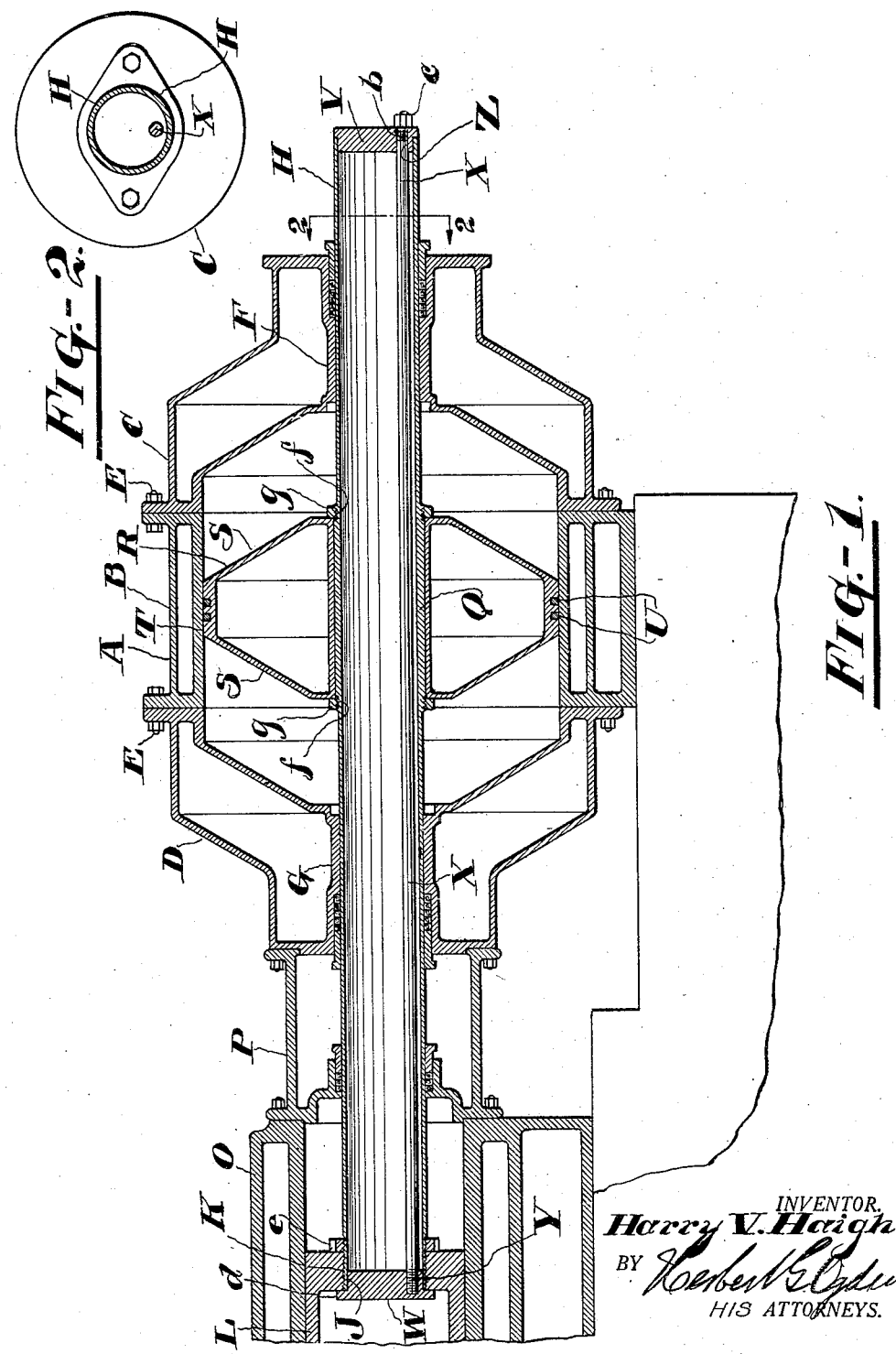
INVENTOR.
Harry V. Haight.
BY
HIS ATTORNEYS.

Patented May 6, 1930

1,757,082

UNITED STATES PATENT OFFICE

HARRY V. HAIGHT, OF SHERBROOKE, QUEBEC, CANADA, ASSIGNOR TO INGERSOLL-RAND COMPANY, OF JERSEY CITY, NEW JERSEY, A CORPORATION OF NEW JERSEY

PISTON ROD

Application filed February 17, 1927. Serial No. 169,040.

This invention relates to piston rods, but more particularly to piston rods adapted to move in a horizontal plane, as in horizontal compressors, engines and the like.

One object of the invention is to prevent deflection of the piston rod due to the weight of the piston which it supports, thus enabling the piston to be held substantially concentric with respect to the cylinder.

Other objects will appear hereinafter.

The invention consists of the combination of elements, features of construction, and arrangement of parts substantially as hereinafter described and claimed and illustrated in the accompanying drawings, in which—

Figure 1 is a longitudinal sectional elevation of a compressor having the invention applied thereto, and Figure 2 is a transverse view taken through Figure 1 on line 2—2 looking in the direction indicated by the arrows.

Referring to the drawings, the invention is shown embodied in a compressor designed generally by A. The compressor A is of the horizontal double acting type and has a cylinder B to the ends of which are secured heads C and D by means of bolts E. The usual inlet and exhaust valves have in this instance been omitted from the drawings for the sake of simplicity of illustration.

Formed integrally with the heads C and D are bearing portions F and G respectively for a piston rod H. The piston rod H in the present instance is of the hollow or tubular form and is externally threaded as at J to cooperate with a threaded aperture K in the end of a cross head L, said cross head L being disposed slidably in a cross head guide O connected to the head D by means of a distance piece P.

Intermediate the ends of the piston rod H is a hub portion Q which forms a seat for a hollow piston R reciprocable in the cylinder B. The end walls S of the piston R preferably converge so that the face T of the piston will be relatively narrow to reduce contact between the piston and the cylinder to the width desired. The face T of the piston R is suitably grooved to receive the usual piston rings U.

As is well known, a problem which requires a great deal of consideration in structures of this type is that of suitably supporting the piston in the cylinder to prevent the weight of the piston from being supported by the wall of the cylinder. Various means have heretofore been devised for preventing this condition, as for instance, increasing the diameter of the piston rod. This expedient, however, has not proved satisfactory since the increased diameter of the piston rod merely increases the weight thereof which, together with the weight of the piston, will produce sufficient deflection of the piston rod to cause the piston to ride more or less heavily on one side of the cylinder.

In order to prevent such deflection of the piston rod, in the present instance, heads V and W are provided for the ends of the piston rod and a tension rod X having a threaded end Y is screwed into the head W and extends through the piston rod through an aperture Z in the head V. The opposite end b of the tension rod X is likewise threaded to receive a nut c whereby a pressure may be exerted against the head V which will counteract any tendency of the piston rod H to flex or curve in a downwardly direction due to the weight of the rod and the piston R.

The tension rod X is preferably located near the wall of the piston rod H from which it is suitably spaced and on the vertical center line of the piston rod so that a maximum force may be produced for the purpose described. The tension rod X may however occupy any other desired position which will enable the piston rod H to be suitably held against deflection.

To the end that the cooperating threads of the piston rod H and the aperture K may be properly protected against the thrust of the piston rod in one direction, a flange d is formed on the head W to abut the cross head L and a lock nut e screwed on the threaded end of the piston rod to bear against the end of the cross head L protects these threaded portions against the effects of the thrust of the piston rod in the opposite direction.

In order to hold the piston R against longitudinal movement with respect to the piston rod H, the ends of the hub portion Q are provided with threads $f$ on which are screwed nuts $g$ to bear against the ends of the piston R.

By means of the present invention the reciprocatory elements of the compressor or engine to which the invention may be applied may be greatly reduced in weight and the piston rod H will at all times be held against deflection. As a result of this construction the piston R may be held concentrically with respect to the cylinder, thus protecting the cylinder walls against excessive wear which so frequently takes place in machines having pistons of large diameter and consequently great weight.

The present invention also assures an adequate supply of lubricant to the cooperating surfaces of the cylinder and the piston, thus enabling these parts to render service for a comparatively greater length of time than would similar elements in machines in which the piston is supported chiefly by the cylinder wall. A still further advantage of this invention is that the piston rod may be caused to run true in its guides or bearings so that these parts will also be protected against the excessive wear which results whenever deflection of the piston rod takes place.

I claim:

1. A hollow piston rod having end heads, and means extending through one side of the piston rod exerting a force on the end heads to prevent curvature of the piston rod, said means contacting with the piston rod only at the extremities of said piston rod.

2. A hollow piston rod having end heads, and a tension rod extending through one side of the piston rod exerting a force on the end heads to prevent curvature of the piston rod, said tension rod contacting only with the end heads.

3. In combination, a cylinder, a piston in the cylinder, a hollow piston rod for the piston, means for securing the piston intermediate the ends of the piston rod, and a tension rod exerting a force on the ends of the piston rod to prevent deflection of the intermediate portion of said piston rod due to the weight of the piston and of the rod.

4. In combination, a cylinder, a hollow piston in the cylinder, a hollow piston rod extending through the piston, said rod having spaced external threaded portions, nuts cooperating with the threaded portion for holding the piston against longitudinal movement with respect to the piston rod, heads in the ends of the piston rod, and means including a tension rod and a nut exerting a force on the heads to hold the intermediate portion of the piston rod against deflection due to the weight of the piston, thus holding the piston concentric with respect to the cylinder, said tension rod extending through the piston rod and being off-set with respect to the longitudinal axis of the piston rod.

In testimony whereof I have signed this specification.

HARRY V. HAIGHT.